Dec. 31, 1957  J. H. JONES  2,817,892
JIG FOR PRE-ASSEMBLING PLUMBING UNITS
Filed July 11, 1955  3 Sheets-Sheet 1
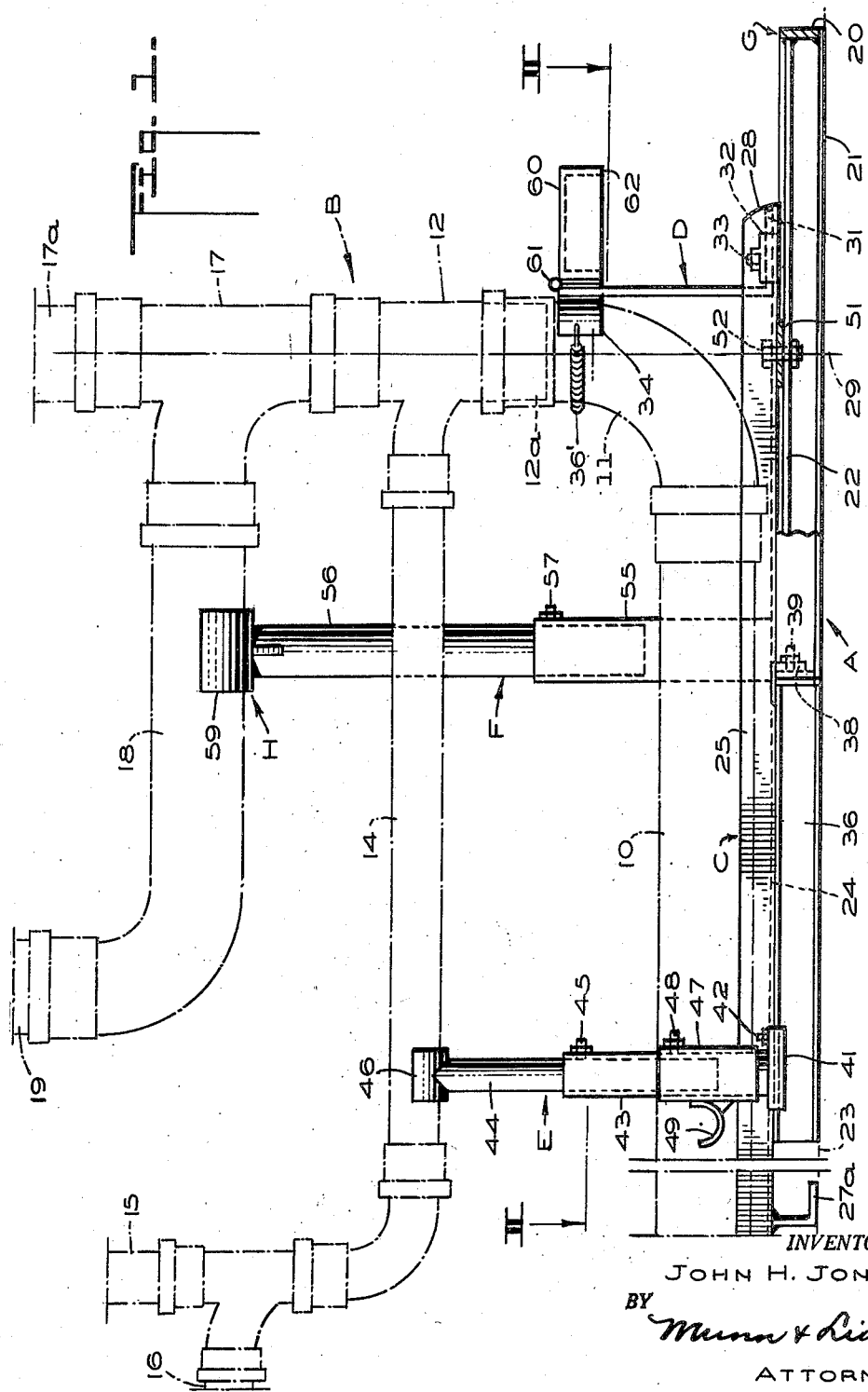
INVENTOR.
JOHN H. JONES
BY Munn & Liddy
ATTORNEYS

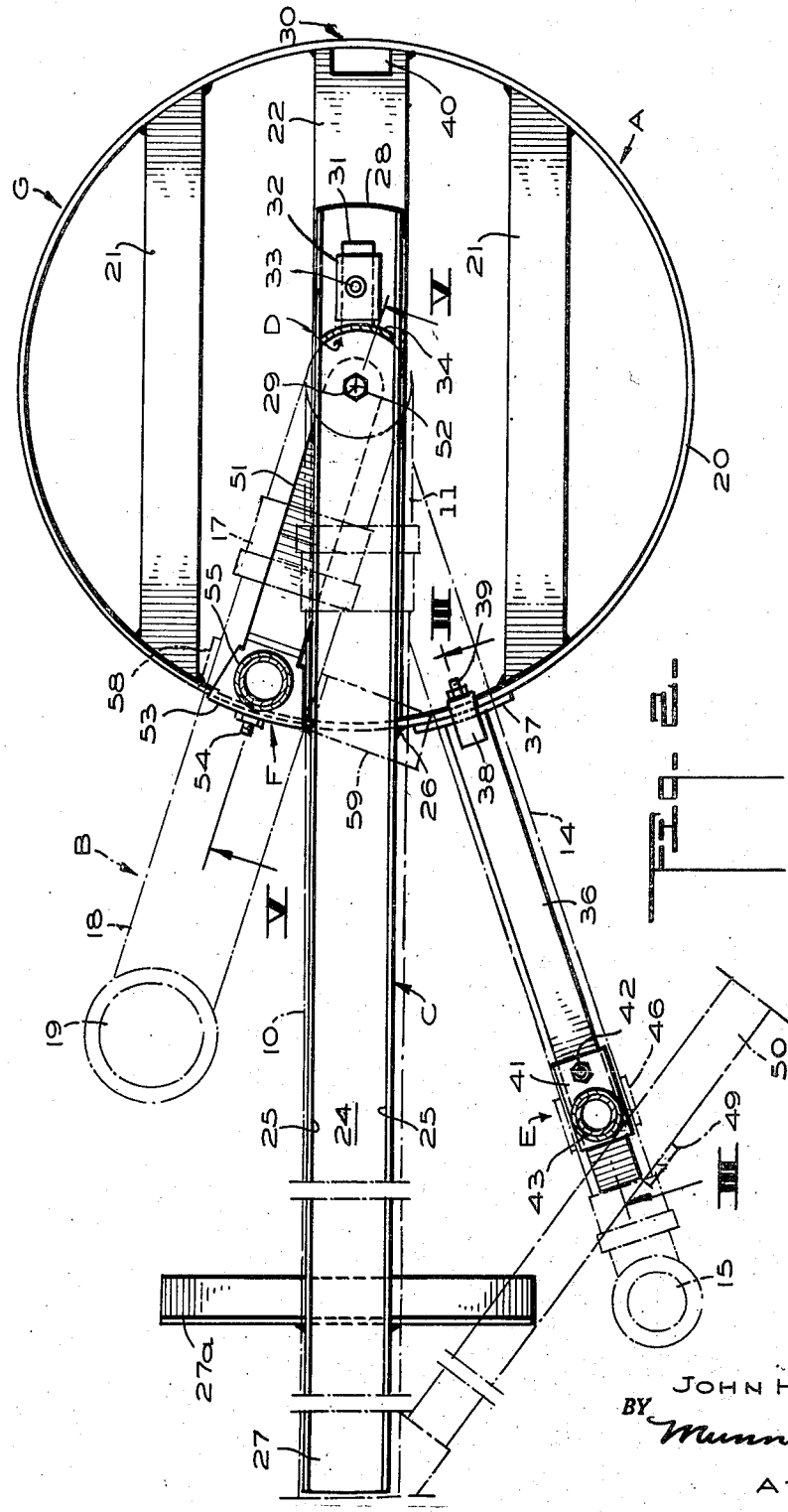

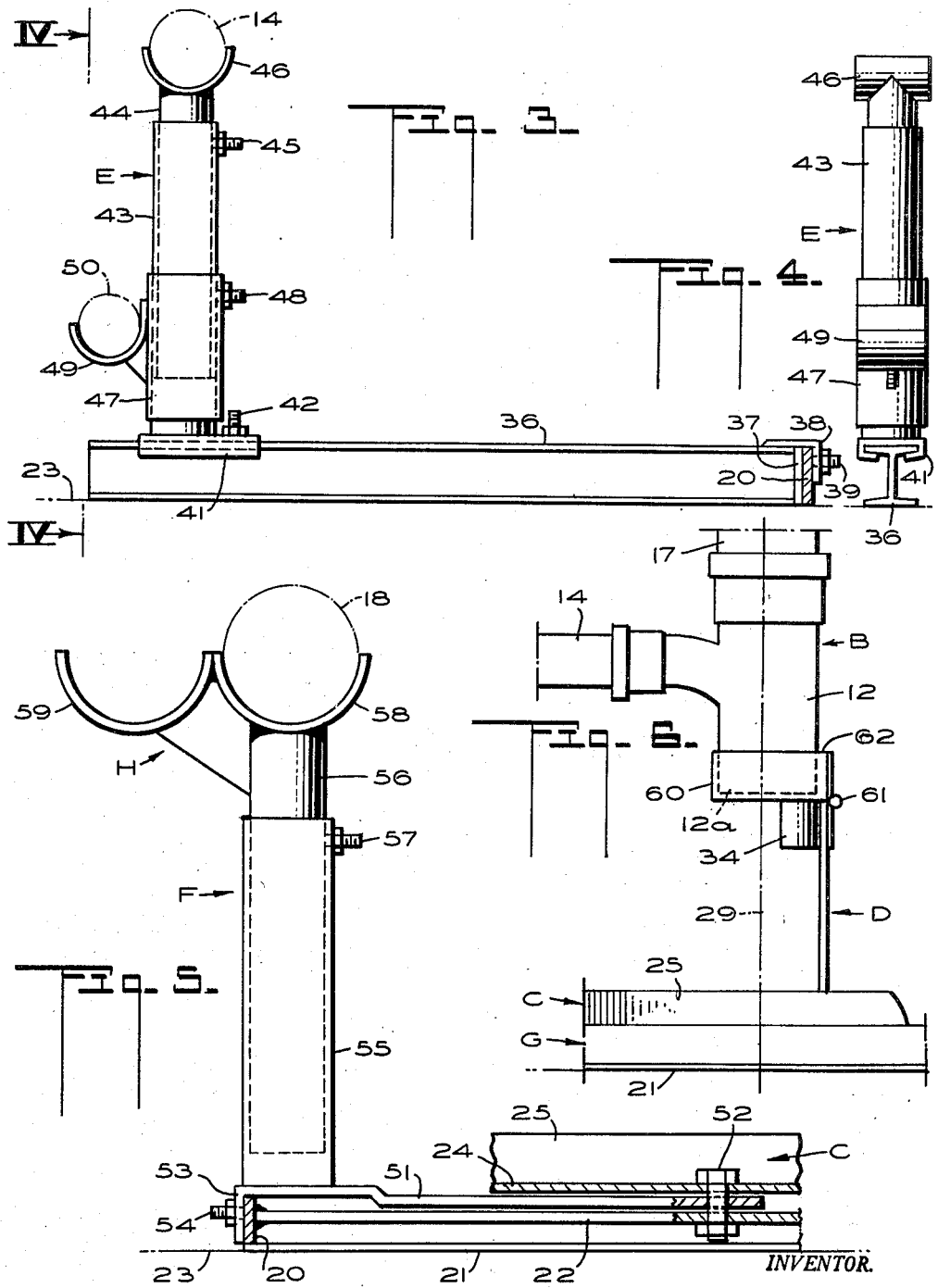

United States Patent Office 2,817,892
Patented Dec. 31, 1957

2,817,892

JIG FOR PRE-ASSEMBLING PLUMBING UNITS

John H. Jones, Carmichael, Calif., assignor, by mesne assignments, to B & J Manufacturing Company, Carmichael, Calif., a copartnership consisting of Custer R. Benson, Jack De Lain, and Ralph D. Lingenfelter Application July 11, 1955, Serial No. 521,107

3 Claims. (Cl. 29—287)

This invention relates to a jig for pre-assembling plumbing units. It consists of the combinations, constructions and arrangements of parts, as hereinafter described and claimed.

At the present time, it is a common practice for plumbers to assemble various pipes and fittings for connecting the outlets of basins, toilets, bath tubs, and the like, with the sewer lines. Such procedure requires the caulking and leading of the joints; and is time consuming, especially when done on the site of the buildings under construction. It has been the practice of plumbers to utilize blocks and wires to support the pipes and fittings while they are being sealed, even when plumbing units are fabricated in the shops.

Accordingly, and as the cardinal object of my invention, it is proposed to provide an adjustable jig, whereby various plumbing units may be readily assembled. Moreover, the jig may be easily adjusted to permit different arrangements and combinations of pipes and fittings to be obtained, all with the minimum amount of effort.

It will be appreciated, of course, that when homes are built in subdivisions, many of the floor plans are the same, although various modifications are often made. Thus the plumbing in many of the homes is identical with one another, requiring the assembling of a plurality of identical units. The same is true of the duplication of plumbing units in office buildings, etc. My jig is designed in such a manner as to aid the plumbers in assembling the required units, permitting the jig to be changed rapidly from one set-up to another.

Other objects and advantages will appear as the specification continues. The novel features will be set forth in the claims hereunto appended.

DRAWINGS

For a better understanding of my invention, reference should be had to the accompanying drawings, forming part of this specification, in which:

Figure 1 is a fragmentary side elevational view of my jig for pre-assembling plumbing units, portions being shown in section;

Figure 2 is a horizontal sectional view taken along the plane II—II of Figure 1;

Figure 3 is a side elevational view of one of the adjustable pipe-supports, as seen from the plane III—III of Figure 2, but showing its pipe-supporting saddle as being turned into a different angular position from that of Figure 2;

Figure 4 is an end elevational view of the same pipe-support, as observed from the vertical plane IV—IV of Figure 3;

Figure 5 is a sectional view taken along the line V—V of Figure 2, disclosing another pipe-support, but showing its twin saddle support turned into another position from that of Figure 2; and Figure 6 is a fragmentary side elevational view of a portion of the jig, illustrating an alternate method of pre-assembling plumbing units.

While I have shown only the preferred form of my invention, it should be understood that various changes, or modifications, may be made within the scope of the annexed claims without departing from the spirit thereof.

*Detailed description*

Referring now to the drawings, it will be noted that I have provided a jig indicated generally at A, which is adapted to be used for pre-assembling plumbing units B. The latter are generally referred to in the trade as "Christmas trees"; and, of course, vary in accordance with the plumbing requirements at a particular location.

For the purpose of illustration only, the plumbing unit or "Christmas tree" B has been disclosed as including a main outlet or soil pipe 10, which leads to the sewer line. As shown in Figure 1, the pipe 10 has the lower end of a conventional elbow 11 connected thereto, while the upper end of this elbow is coupled to a T 12, the latter being arranged vertically above the elbow.

Moreover, the unit B has been shown as having a drain pipe 14 coupled thereto, with this pipe extending to traps of wash basin and bath tub outlet pipes 15 and 16, respectively, so as to receive water therefrom. Also, the unit provides a second T 17, which is coupled to the first T 12, with the T 17 having a drain pipe 18 leading therefrom to a toilet outlet pipe 19 (see Figure 1). For venting the system a vent pipe 17a has been provided at the top of the T 17.

As previously expressed, and here repeated, the plumbing unit B has been selected only for the purpose of illustrating the use of my jig A. It is well known that the joints provided by the various fittings of this unit are caulked and then sealed by molten lead. My jig is designed to hold the fittings and pipes in proper relation with one another, while they are caulked and sealed. Also, the jig may be readily adjusted so that all parts of the plumbing unit or "Christmas tree" may be assembled to meet the set up required for a particular home or office building.

Furthermore, after the jig has been adjusted for the pre-assembling of a particular plumbing unit B, the latter may be duplicated many times. Thus considerable time and labor may be saved, when providing plumbing units for subdivisions, wherein the floor plans of many homes are identical or similar to one another.

Broadly speaking, the jig A includes an elongated supporting member C for holding the main outlet pipe 10, a stand D for retaining the elbow 11 in position, an adjustable support E on which the drain pipe 14 is mounted, and a second adjustable support F for holding the drain pipe 18 in proper position. Also, the jig provides a horizontally-disposed circular base track G around which the supports E and F may be adjusted, independently of one another.

In its structural features, the circular track G defines cylindrical rim 20 having reinforcing bars 21 secured in any suitable manner to the base thereof. Moreover, a diametrically-extending swivel bar base 22 is fixed to the cylindrical rim 20 of the track (see Figures 1, 2 and 5). This track is adapted to rest directly upon the ground or floor 23 so as to be supported thereby.

As shown in the drawings, the elongated supporting member C has been provided by a structural channel. The web 24 and flanges 25 of this channel define a guide in which the main outlet pipe 10 may be placed. The channel overlies the cylindrical rim 20 of the track and is secured thereto, for example, by welding 26 (see Figure 2).

Generally speaking, the member C extends radially with respect to the circular track, and has its outer end 27 projecting to a considerable distance beyond the periphery of the track. This end of the channel is provided with an angle-shaped foot 27a, which is adapted to rest on the ground or floor 23 to hold the channel against tilting. This foot extends laterally beyond both sides of the channel. However, the inner end 28 of the channel-shaped member G is disposed between the vertical axis 29 of the circular track and the side 30 of the latter opposite to the projecting end 27 of the channel (see Figure 2).

In order to retain the elbow 11 in place with one end thereof projecting upwardly, the stand D is provided with a horizontal foot 31 thereon, which is adapted to be telescoped under a bracket 32 fixed to the web 24 of the channel-shaped member C. Also, a set-screw 33 is threaded through the bracket 32 for the purpose of clamping the stand D in adjusted position relative to the vertical axis 29 of the track. This stand is provided with an arc-shaped saddle 34 at its top, the latter being positioned to embrace an upper portion of the elbow so as to hold the latter against turning or displacement. As disclosed in Figure 1, a spring-tension chain 36' is attached to the saddle 34 and is looped around the elbow 11, thus keeping the latter in place when hammering on the main outlet or soil pipe 10.

In connection with the adjustable support E, it will be observed that a horizontal beam or arm 36 extends radially from the outer periphery of the cylindrical rim 20. The inner end of this beam is provided with a curved guide bar 37, which is adapted to abut the outer peripheral surface of the rim 20 (see Figures 2 and 3). An angle-shaped bracket 38 is secured to the top of the beam 36, and hooks over the inner surface of the rim 20. The vertical leg of this bracket carries a set-screw 39, whereby the beam may be clamped to the rim 20.

It will be quite apparent that the beam 36 may be adjusted to any angular or radial position along the circular track G, with the exception of the space occupied by the channel-shaped member C. When this beam is moved to a position extending from the right-hand side of the circular track (Figure 2), and in prolongation with the channel C, the bracket 38 may be inserted into a slot 40 fashioned in the swivel bar base 22.

Moreover, the adjustable support E includes a slide 41, which may be adjusted lengthwise of the beam 36, and then clamped to the beam by tightening a set-screw 42 (see Figures 1 to 3, inclusive). This slide has an upright tubular standard 43 fixed thereto so as to rise therefrom. An adjustable standard 44 is telescoped into the standard 43, and the former may be raised, lowered or rotated relative to the latter. A set-screw 45 is carried by the standard 43 so as to clamp the standard 44 in adjusted position.

At the top of the adjustable standard 44 there is provided a curved saddle 46, which has been used in the present disclosure for supporting the drain pipe 14. Quite obviously, the pipe 14 may extend in different directions from the T 12 and at varying heights above the main outlet pipe 10, depending upon the particular plumbing situation. The adjustable standard E may be changed in angular or radial relation around the track G, and the standard 44 may be raised or lowered, thus providing the proper support for the pipe 14, or other suitable part of the plumbing or "Christmas tree" unit B.

As a further structural feature, the tubular standard 43 has an outer sleeve 47 telescoped thereover. The sleeve may be adjusted up and down on the standard 43, or rotated relative to the latter, and then clamped in adjusted position by a set-screw 48. The sleeve 47 is provided with a curved saddle 49, which may be utilized for supporting a pipe 50. The latter has been illustrated in Figure 2 as extending in angular relation with respect to the main outlet pipe 10 and communicating therewith.

Turning now to the details of the adjustable support F, as shown in Figures 1, 2 and 5, it includes a swingable arm 51, which is disposed radially of the circular track G. The inner end of this arm is interposed between the swivel bar base 22 and the web 24 of the channel member C, and is pivotally secured to both by a journal pin or bolt 52. This pin coincides with the vertical axis 29 of the circular track, and thus the arm 51 may be swung horizontally into any desired radial position relative to the circular track, with the exception of the space occupied by the channel member C.

As shown in Figures 2 and 5, the arm 51 has a downwardly-extending flange 53 at its outer end, which is disposed to ride along the exterior periphery of the cylindrical rim 20, and may be clamped thereto by tightening a set-screw 54. This arm has a tubular standard 55 fixed thereto so as to extend vertically therefrom. It will be noted that an adjustable standard 56 is telescoped into the standard 55 so that the former may be raised, lowered or rotated relative to the latter. A set-screw 57 is provided on the standard 55 for clamping the standard 56 in adjusted position.

Moreover, the standard 56 is provided at its top with a twin saddle unit, which is designated generally at H in Figures 1 and 5. The curved saddle 58 of this unit is disposed directly above this standard, while the curved saddle 59 projects laterally from the standard 56. As illustrated in Figures 2 and 5, the drain pipe 18 is supported by the saddle 58, since this pipe has been disclosed as extending in angular relation with respect to the main outlet or soil pipe 10. However, in the event that the pipe 18 is arranged directly above the pipe 10, in order to meet the plumbing situation, the saddle 59 is long enough to extend over the channel member C to thereby constitute a support for the pipe 18. This arrangement is necessary, since the arm 51 cannot swing beneath the channel.

It will be appreciated that in different buildings the outlet pipe 10 might vary in directions, according to the location of the main sewer. Also, if the plumbing unit or "Christmas tree" B is quite heavy, the pipe 10 and the elbow 11 may be omitted during prefabrication and installed later on the job. For this reason, I have provided a cup 60 that is swingably secured by a hinge 61 to the top of the stand D.

Normally, the cup 60 is disposed in an out-of-the-way position, as shown in Figure 1, thus allowing the elbow 11 and the outlet pipe 10 to be pre-assembled with the remainder of the unit B. However, Figure 6 illustrates the cup 60 as being swung into a position wherein it will rest on the top of the saddle 34, with the rim 62 of the cup extending upwardly. At this time, the lower end 12a of the T 12 may be telescoped into the cup for support thereby. The remaining parts of the unit B may be assembled in the manner previously described, by utilizing the jig A, and the elbow 11 and the pipe 10 added on the job.

Particular attention is called to the fact that the axes of the T's 12 and 17 coincide with the vertical axis 29 of the circular base track G. Thus these T's may be turned about their respective axis so that the pipes 14 and 18 will extend in the desired direction.

I claim:

1. In a jig for pre-assembling plumbing units: an elongated supporting member designed to have a main outlet pipe of a plumbing unit placed directly thereon for support thereby; a stand secured to said member and projecting thereabove; the stand having a horizontally-disposed saddle thereon, which is arranged to embrace a vertically-arranged upper end of an elbow, the latter being connected to the outlet pipe, to thereby retain the elbow in position, when additional fittings and pipes of the plumbing unit are added to the elbow; a horizontally-disposed circular base track secured to said elongated member; an arm disposed radially relative to the circular base track and projecting toward the vertical axis of the track; an adjustable support carried by the arm, and having means disposed for supporting a selected part of the plumbing unit as the latter is assembled; the arm and its adjustable support being swingable along the track into various radial positions, while still projecting toward the vertical axis of the track; the stand and its saddle being adjustable toward and away from said vertical axis of the circular track, whereby elbows of different sizes may be supported by the saddle with the upper end of the elbow being arranged concentric with said axis.

2. The jig for pre-assembling plumbing units, as defined in claim 1; and in which said elongated member consists of a horizontally-disposed channel, which has spaced-apart flanges projecting upwardly from its web; the flanges and web providing a guide in which the main outlet pipe may be placed and held; said member being disposed radially relative to the circular track.

3. In a jig for pre-assembling plumbing units: an elongated supporting member designed to have a main outlet pipe of a plumbing unit placed directly thereon for support thereby; a stand secured to said member, and having means thereon to support a vertically-arranged upper end of an elbow, the latter being connected to said pipe, to thereby retain the elbow in position when additional fittings and pipes of the plumbing unit are added to and above the elbow; a horizontally-disposed circular base track secured to said elongated member, and defining a circular rim; a swingable arm disposed radially relative to the track, and having its inner end pivotally secured to the elongated member at the vertical axis of the circular track; said elongated member overlying the circular track and projecting radially therebeyond; the arm having an outer end movable around the track, with the exception of that part of the track occupied by said member; means releasably clamping the arm in adjusted position relative to the track; an adjustable support carried by the swingable arm and rising therefrom, and including a standard which has a saddle projecting laterally from the standard; this saddle being movable into a position directly overlying the elongated member, when the arm is moved into a position adjacent to said member, whereby a part of the plumbing unit may be supported by this saddle in a position directly over the main outlet pipe.

References Cited in the file of this patent

UNITED STATES PATENTS

| | | |
|---|---|---|
| 546,421 | Duke | Sept. 17, 1895 |
| 842,007 | Parker | Jan. 22, 1907 |
| 1,465,330 | Ardner | Aug. 21, 1923 |
| 2,427,695 | Smith | Sept. 23, 1947 |
| 2,453,046 | Sutton | Nov. 2, 1948 |
| 2,774,134 | Smith et al. | Dec. 18, 1956 |